(12) United States Patent
Jeong et al.

(10) Patent No.: US 12,028,632 B2
(45) Date of Patent: Jul. 2, 2024

(54) IMAGE SENSOR WITH DATA BUFFER CLUSTERS

(71) Applicant: SAMSUNG ELECTRONICS CO., LTD., Suwon-si (KR)

(72) Inventors: Inje Jeong, Suwon-si (KR); Jaeha Eom, Suwon-si (KR); Sujong Jang, Suwon-si (KR); Younghun Han, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 122 days.

(21) Appl. No.: 17/952,973

(22) Filed: Sep. 26, 2022

(65) Prior Publication Data

US 2023/0171519 A1 Jun. 1, 2023

(30) Foreign Application Priority Data

Nov. 26, 2021 (KR) .................. 10-2021-0164990
May 12, 2022 (KR) .................. 10-2022-0058544

(51) Int. Cl.
*H04N 25/71* (2023.01)
*H04N 25/771* (2023.01)
*H04N 25/772* (2023.01)

(52) U.S. Cl.
CPC ......... *H04N 25/745* (2023.01); *H04N 25/771* (2023.01); *H04N 25/772* (2023.01)

(58) Field of Classification Search
CPC .. H04N 25/745; H04N 25/772; H04N 25/771; H04N 25/78; H04N 25/7795; H04N 25/767

See application file for complete search history.

(56) References Cited

U.S. PATENT DOCUMENTS

| | | | |
|---|---|---|---|
| 7,876,362 B2 | 1/2011 | Krymski | |
| 8,159,589 B2 | 4/2012 | Lim et al. | |
| 9,077,919 B2 | 7/2015 | Wakabayashi et al. | |
| 9,374,097 B2 | 6/2016 | Taura | |
| 9,706,156 B2 | 7/2017 | Lee et al. | |
| 9,819,891 B2 | 11/2017 | Lee et al. | |
| 2009/0273694 A1* | 11/2009 | Krymski | H04N 25/75 348/308 |
| 2016/0028974 A1* | 1/2016 | Guidash | H04N 25/671 348/294 |
| 2018/0234656 A1* | 8/2018 | Krymski | H04N 25/767 |

FOREIGN PATENT DOCUMENTS

JP 2014-241458 A 12/2014

* cited by examiner

*Primary Examiner* — Nicholas G Giles
(74) *Attorney, Agent, or Firm* — Fish & Richardson P.C.

(57) ABSTRACT

An image sensor includes an analog-to-digital conversion circuit that receives pixel signals from column lines, respectively, and converts the pixel signals into first pixel values, respectively. Data buffer clusters correspond to enable signals transferred from a timing controller, respectively, and output second pixel values. Each of the data buffer clusters stores first pixel values, which correspond to some column lines consecutively arranged among the column lines, among the first pixel values and output stored pixel values as some second pixel values among the second pixel values in response to a corresponding enable signal. A digital processing circuit performs digital processing on the second pixel values output from the data buffer clusters.

20 Claims, 10 Drawing Sheets

IMAGE SENSOR WITH DATA BUFFER CLUSTERS

CROSS-REFERENCE TO RELATED APPLICATIONS

This application claims priority to and the benefit of Korean Patent Application No. 10-2021-0164990 filed in the Korean Intellectual Property Office on Nov. 26, 2021, and priority to and the benefit of Korean Patent Application No. 10-2022-0058544 filed in the Korean Intellectual Property Office on May 12, 2022, the entire contents of which are incorporated herein by reference.

BACKGROUND

(a) Field

The disclosure relates to an image sensor.

(b) Description of the Related Art

An image sensor generates pixel signals that vary depending on an amount of incident light and performs analog to digital conversion on the pixel signals to generate image data. The image sensor converts the pixel signal of one row into the image data, stores the image data, and transfers the stored image data to a digital circuitry. Many columns are formed in a pixel array of the image sensor. Particularly, the number of columns increases as resolution increases. In this case, the image data corresponding to the column positioned at the back may be transferred with delay to the digital circuitry. Due to the delay time, it may be difficult to satisfy a timing condition for transferring the image data to the digital circuitry and a large peak current may occur by processing the image data in the digital circuitry at high speed.

SUMMARY

Some embodiments may provide an image sensor for reducing transmission delay of image data.

According to some embodiments, an image sensor includes an analog-to-digital conversion circuitry, a timing controller, a plurality of data buffer clusters, and a digital processing circuitry. The analog-to-digital conversion circuitry may receive a plurality of pixel signals from a plurality of column lines, respectively, and convert the plurality of pixel signals into a plurality of first pixel values, respectively. The timing controller may output a plurality of enable signals. The plurality of data buffer clusters may correspond to the plurality of enable signals, respectively, and output a plurality of second pixel values. Each of the data buffer clusters may store first pixel values, which correspond to some column lines consecutively arranged among the plurality of column lines, among the plurality of first pixel values, and output stored first pixel values as some second pixel values among the plurality of second pixel values in response to a corresponding enable signal among the plurality of enable signals. The digital processing circuitry may perform digital processing on the plurality of second pixel values output from the plurality of data buffer clusters.

According to some embodiments, an image sensor includes an analog-to-digital conversion circuitry, a timing controller, a plurality of data buffer clusters, a plurality of buses, and a digital processing circuitry. The analog-to-digital conversion circuitry may receive a plurality of pixel signals from a plurality of column lines, respectively, and convert the plurality of pixel signals into a plurality of first pixel values, respectively. The timing controller may output an enable signal. The plurality of data buffer clusters may output a plurality of second pixel values. Each of the data buffer clusters may store first pixel values, which correspond to some column lines consecutively arranged among the plurality of column lines, among the plurality of first pixel values, and may output stored first pixel values as some second pixel values among the plurality of second pixel values in response to the enable signal. The plurality of buses may be connected to the plurality of data buffer clusters, respectively, and each of the buses may transfer the enable signal from the timing controller to a connected data buffer cluster among the plurality of data buffer clusters. The digital processing circuitry may perform digital processing on the plurality of second pixel values output from the plurality of data buffer clusters.

According to some embodiments, an image sensor includes a pixel array, an analog-to-digital conversion circuitry, a timing controller, a first data buffer cluster, a second data buffer cluster, and a digital processing circuitry. The pixel array may include a plurality of first pixels consecutively arranged in a row direction and a plurality of second pixels consecutively arranged in the row direction. The analog-to-digital conversion circuitry may convert first pixel signals of the plurality of first pixels into a plurality of first pixel values, respectively, and convert second pixel signals of the plurality of second pixels into a plurality of second pixel values, respectively. The timing controller may output a first enable signal and a second enable signal. The first data buffer cluster may store the plurality of first pixel values and may output the plurality of first pixel values in response to the first enable signal. The second data buffer cluster may store the plurality of second pixel values and may output the plurality of second pixel values in response to the second enable signal. The digital processing circuitry may perform digital processing on the plurality of first pixel values output from the first data buffer cluster and the plurality of second pixel values output from the second data buffer cluster.

DETAILED DESCRIPTION OF THE EMBODIMENTS

Figure 1:
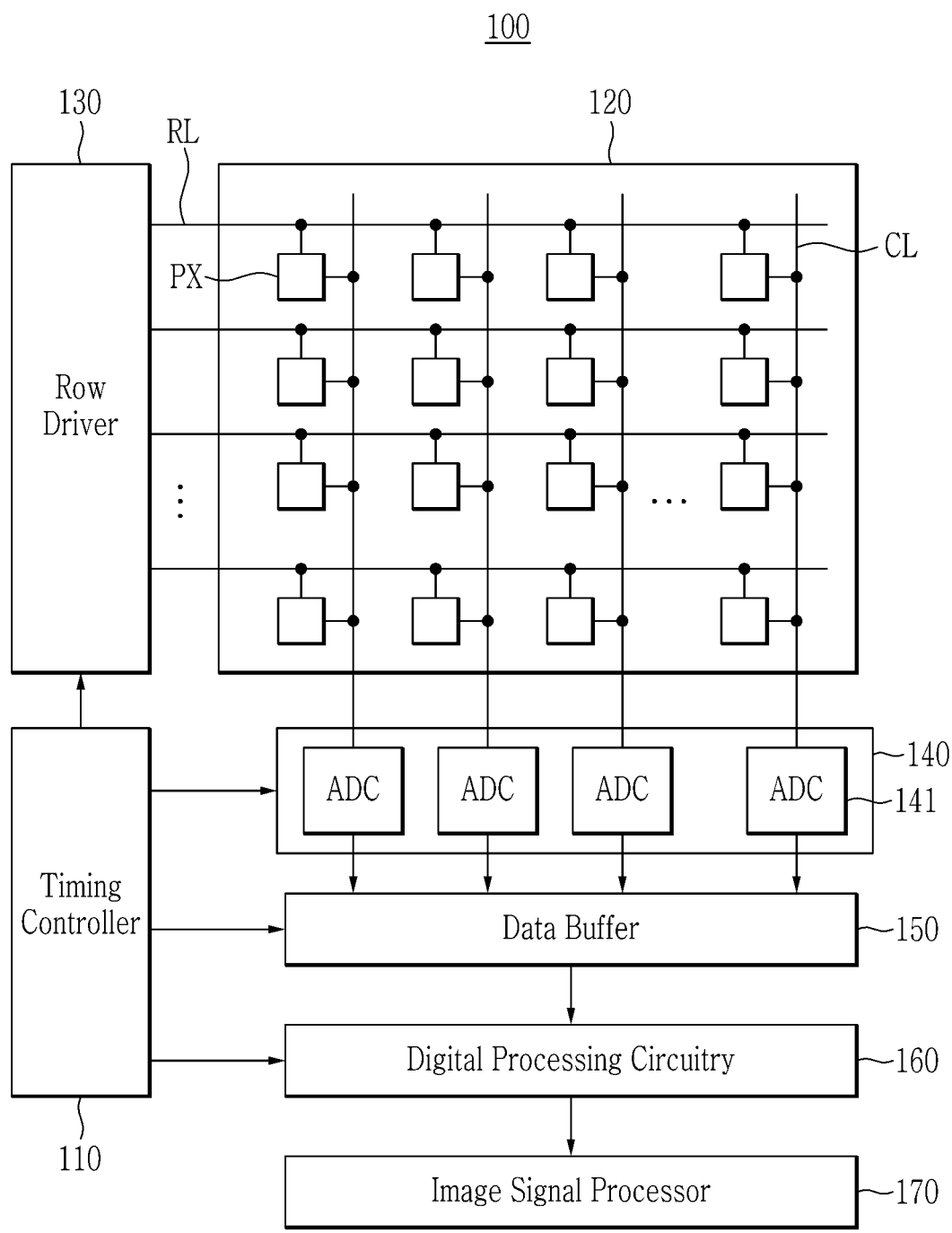
FIG. 1 and FIG. 2 are example block diagrams of an image sensor.
Figure 2:
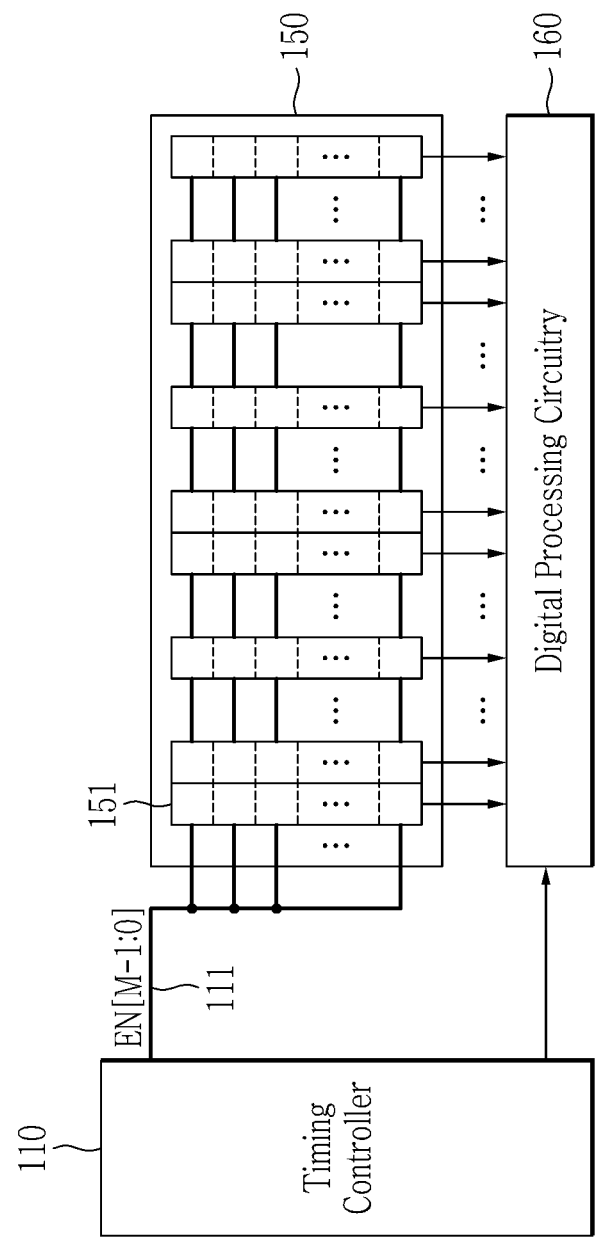
Figure 3:
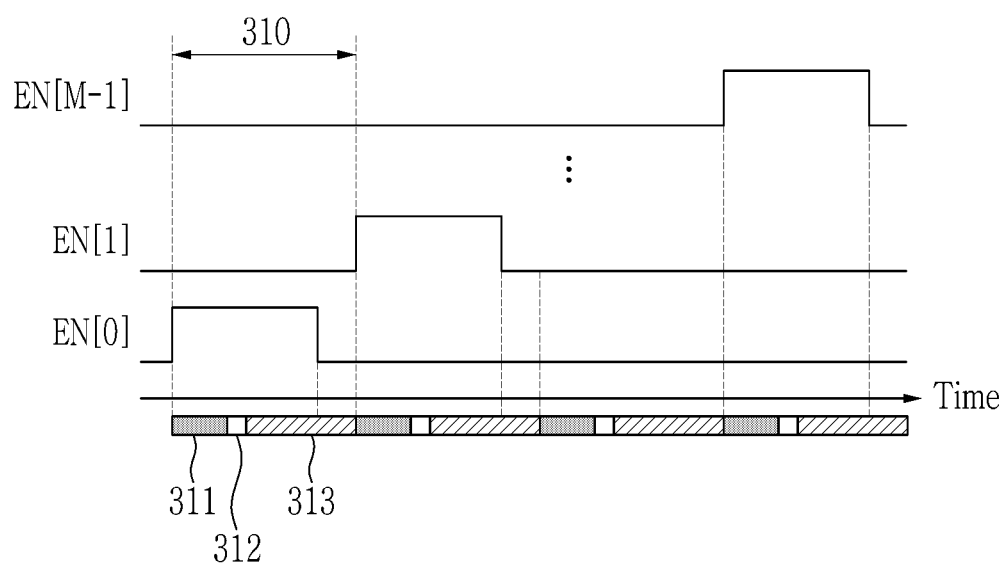
FIG. 3 is an example drawing showing an operation timing of an image sensor.

Each of FIG. 1 and FIG. 2 is an example block diagram of an image sensor, and FIG. 3 is an example drawing showing an operation timing of an image sensor.

Referring to FIG. 1, an image sensor 100 may include a timing controller 110, a pixel array 120, a row driver 130, an analog-to-digital conversion circuitry (hereinafter referred to as "ADC circuitry") 140, a data buffer 150, and a digital processing circuitry 160. In some embodiments, the image sensor 100 may further include an image signal processor 170 as shown in FIG. 1. In some embodiments, the image sensor 100 may be connected to an external image signal processor 170.

The image sensor 100 may be mounted on an electronic device having an image sensing or optical sensing function. For example, the image sensor 100 may be mounted on electric devices such as a camera, a smartphone, a wearable device, an Internet of Things (IoT) device, a home appliance, a tablet personal computer (PC), a personal digital assistant (PDA), a portable multimedia player (PMP), a navigation, a drone, and advanced driver assistance systems (ADAS). Alternatively, the image sensor 100 may be mounted on an electronic device provided as a component in a vehicle, furniture, manufacturing equipment, a door, various measurement devices, and the like.

The timing controller 110 may control a timing of the image sensor 100. In some embodiments, the timing controller 110 may control the timing of the row driver 130, the ADC circuitry 140, the data buffer 150, or the digital processing circuitry 160. The timing controller 110 may provide a control signal for controlling the timing to the row driver 130, the ADC circuitry 140, the data buffer 150, or the digital processing circuitry 160.

The pixel array 120 may include a plurality of pixels PX arranged in a matrix form and a plurality of row lines RL and a plurality of column lines CL that are connected to the plurality of pixels PX. In some embodiments, each pixel PX may include one or more photoelectric conversion elements (e.g., one or more photodetectors). The photoelectric conversion element may detect incident light and convert the incident light into an electrical signal (hereinafter referred to as a "pixel signal") depending on an amount of light. The row line RL may extend in a row direction and be connected to the pixels PX disposed on the same row. For example, the row line RL may transfer a control signal output from the row driver 130 to devices included in the pixels PX, for example, transistors. The column line CL may extend in a column direction and be connected to the pixels PX disposed on the same column. The column line CL may transfer a pixel signal output from the pixel PX to the ADC circuitry 140.

The row driver 130 may generate control signals for driving the pixel array 120 in response to the control signal of the timing controller 110 and provide the pixels PX of the pixel array 120 with the control signals through the row lines RL. In some embodiments, the row driver 130 may control the pixels PX to sense the incident light in row units. The row unit may include one row. In some embodiments, the row unit may include two or more rows. In some embodiments, the row driver 130 may select the pixels PX in row units and control the selected pixels PX to output pixel signals through the column lines CL.

The ADC circuitry 140 may convert pixel signals output from the pixels PX on a selected row among the plurality of pixels PX into pixel values representing an amount of light in response to the control signal output from the timing controller 110. In some embodiments, the ADC circuitry 140 may include a plurality of analog-to-digital converters (hereinafter referred to as "ADCs") 141 that correspond to the plurality of column lines CL, respectively. Each ADC 141 may convert the pixel signal received through a corresponding column line CL into the pixel value. The pixel value may be image data having a plurality of bits.

The data buffer 150 may store the pixel values transferred from the ADC circuitry 140 and may output the stored pixel values in response to an enable signal received from the timing controller 110.

The digital processing circuitry 160 may receive the pixel values from the data buffer 150 and perform digital processing on the received pixel values. In some embodiments, the digital processing may include processing for aligning the pixel values. In some embodiments, the digital processing circuitry 160 may align the pixel value of each pixel based on bits. In some embodiments, the digital processing circuitry 160 may align the pixel values of the pixels based on addresses of the pixels.

The digital processing circuitry 160 may transfer image data having processed (e.g., aligned) pixel values to the image signal processor 170. The image signal processor 170 may perform image signal processing on the received image data.

Referring to FIG. 2, the data buffer 150 may include a plurality of memories 151 that correspond to the plurality of ADCs 141 (or the plurality of column lines CL or the plurality of pixels PX arranged in a row direction), respectively. FIG. 2 shows some memories 151 among the plurality of memories 151. The memory 151 may be implemented with, for example, a static random-access memory (SRAM), a latch, a flip-flop, or a combination thereof, but is not limited thereto.

Each memory 151 may store a plurality of bits corresponding to the pixel value transferred from a corresponding ADC 141. Further, each memory 151 may read and output the stored bits in response to an enable signal EN[M-1:0] from the timing controller 110. Hereinafter, the enable signal for reading the pixel value is referred to as a "read enable signal". In some embodiments, when the pixel value is represented by M bits, the read enable signal EN[M-1:0] may have M bits that correspond to the M bits of the pixel value, respectively. In this case, as the M bits of the read enable signal EN[M-1:0] are sequentially enabled, the memory 151 may sequentially read the stored M bits and output the read bits. The memory 151 may output the $i^{th}$ bit among the stored M bits in response to the $i^{th}$ bit EN[i] of the read enable signal EN[M-1:0].

Referring to FIG. 2 and FIG. 3, the timing controller 110 may transfer the read enable signal EN[M-1:0] to the memories 151 through a bus 111. The memories 151 may sequentially receive the M bits of the read enable signal EN[M-1:0] via the bus 111. The timing controller 110 may sequentially enable the M bits of the read enable signal EN[M-1:0] to sequentially read the M bits of the pixel value from each memory 151. The timing controller 110 may output a pulse (hereinafter referred to as an "enable pulse") having an enable level (e.g., a high level) during a predetermined period as the read enable signal EN[i] corresponding to each bit (the $i^{th}$ bit). For example, the timing controller 110 may output the enable pulse EN[i] corresponding to the $i^{th}$ bit and then output the enable pulse EN[i+1] corresponding to the $(i+1)^{th}$ bit. Here, i is an integer between 0 and (M-1). As another example, the timing controller 110 may sequentially output the M bits of the read enable signal EN[M-1:0] regardless of the bit order. The timing controller 110 may output the enable pulses EN[M-1: 0] so that after a predetermined time has elapsed from a start edge of an enable pulse EN[i], a next enable pulse EN[i+1] has a start edge.

Each memory 151 may read and output the $i^{th}$ bit among the M bits of the pixel value in response to the enable pulse EN[i]. Therefore, the digital processing circuitry 160 may perform the digital processing on the $i^{th}$ bit of the pixel value during a period (hereinafter referred to as "read cycle") 310 between the start edge of the enable pulse EN[i] and the start edge of the enable pulse EN[i+1].

Meanwhile, due to parasitic components formed among the memories 151 and the bus 111, the read enable signal EN[M-1:0] may be delayed whenever it passes through the memories 151. Since the digital processing circuitry 160 may perform the digital processing after receiving all the pixel values of pixels PX on one row, a delay time taken until the read enable signal EN[i] reaches the last memory 151 may not be used for the digital processing in the read cycle 310. Accordingly, when the number of column lines CL of the pixel array 120 is N, a maximum delay time 311 may occur due to the parasitic components of the N memories. In addition, a signal transfer period 312 may be added between the maximum delay time 311 and a digital processing period 313 in the read cycle 310, for a time during which the respective bits of the pixel value read from the memory 151 are routed to the digital processing circuitry 160.

As the image sensor 100 having high resolution is used, many pixels PX may be included in one row. As a result, the maximum delay time 311 is increased so that a time to be used for the signal transmission period 312 or the digital processing period 313 during the read cycle may be reduced. Accordingly, a size of the digital processing circuitry 160 may be increased for high-speed digital processing during the short digital processing period 313, and a peak current may also increase.

Figure 4:
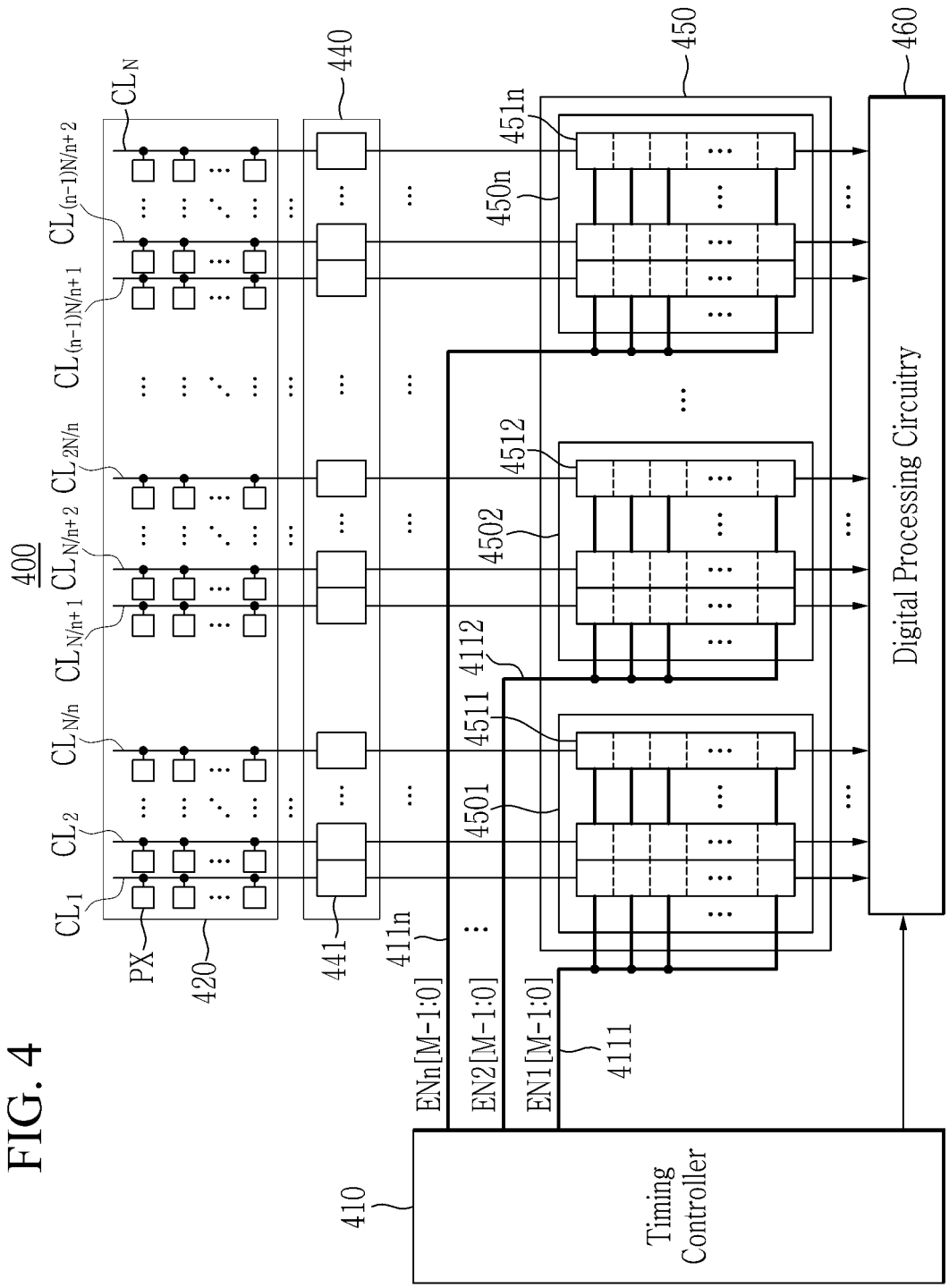
FIG. 4 is an example drawing showing an image sensor according to an embodiment.
Figure 5:
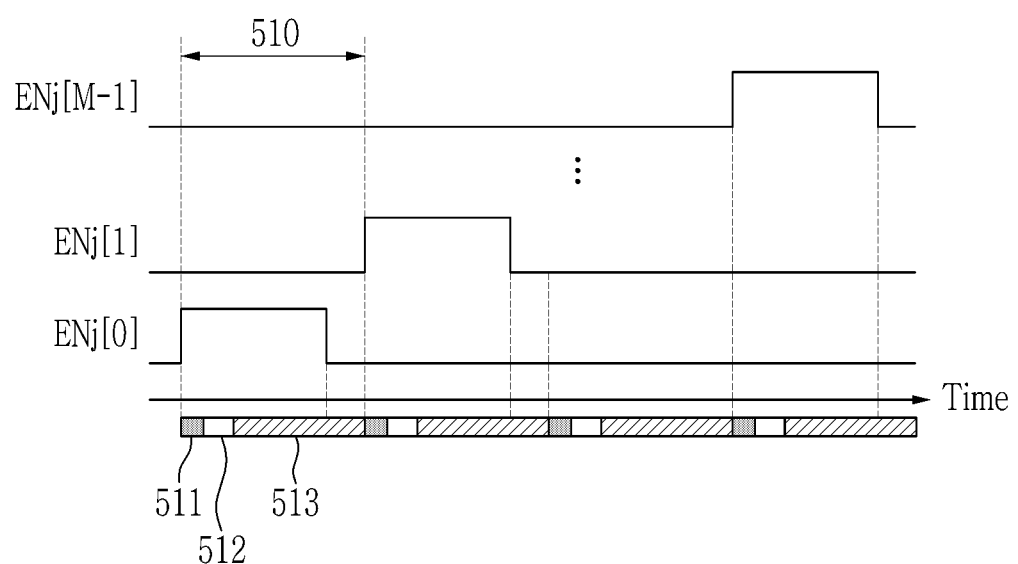
FIG. 5 is an example drawing showing an operation timing of an image sensor according to an embodiment.

FIG. 4 is an example drawing showing an image sensor according to an embodiment, and FIG. 5 is an example drawing showing an operation timing of an image sensor according to an embodiment.

Referring to FIG. 4, an image sensor 400 may include a timing controller 410, a pixel array 420, an ADC circuitry 440, a data buffer 450, and a digital processing circuitry 460. The data buffer 450 may be clustered into a plurality of data buffer clusters 4501, 4502 . . . 450n. Each of the data buffer clusters 4501 to 450n may include a plurality of memories 4511, 4512 . . . 451n.

The pixel array 420 may include a plurality of pixels PX arranged in a matrix form and a plurality of column lines $CL_1$, $CL_2$ . . . $CL_N$ respectively connected to the plurality of pixels PX. N is the number of column lines. As described with reference to FIG. 1, the pixel array 420 may further include a plurality of row lines connected to the plurality of pixels PX and the row lines may be controlled by a row driver. The column lines $CL_1$ to $CL_N$ may transfer pixel signals output from the pixels PX to the ADC circuitry 440. The ADC circuitry 440 may include a plurality of ADCs 441 respectively corresponding to the column lines $CL_1$ to $CL_N$.

The timing controller 410 may transfer read enable signals EN1[M-1:0] to ENn[M-1:0] to the data buffer clusters 4501 to 450n, respectively. In some embodiments, the timing controller 410 may be connected to the data buffer clusters 4501 to 450n via buses 4111, 4112 . . . 411n, respectively. Different data buffer clusters 4501 to 450n may be connected to different buses 4111 to 411n. Accordingly, each data buffer cluster 450j may receive a corresponding read enable signal ENj[M-1:0] transferred through a corresponding bus 411j. Here, j is an integer between 1 and n.

The data buffer clusters 4501 to 450n may receive the pixel values of the pixels PX from the ADCs 441 of the ADC circuitry 440. Each data buffer cluster 450j may correspond to some column lines consecutively arranged in the row direction (or some ADCs 441 of the ADC circuitry 440 or some pixels PX consecutively arranged in the row direction) among the column lines $CL_1$ to $CL_N$ of the pixel array 410. Different data buffer clusters 4501 to 450n may correspond to different column lines. For example, the $j^{th}$ data buffer cluster 450j may correspond to the $((j-1)*N/n+1)^{th}$ to $(j*N/n)^{th}$ column lines $CL_{(j-1)*N/n+1}$ to $CL_{j*N/n}$.

The memories 451j of each data buffer cluster 450j may correspond to a plurality of column lines (e.g., (N/n) column lines $CL_{(j-1)*N/n+1}$ to $CL_{j*N/n}$), respectively. Each memory 451j may store a plurality of bits of a pixel value of a corresponding column line transferred from a corresponding ADC 441. Further, each memory 451j of the data buffer cluster 450j may read and output a plurality of bits of the stored pixel values in response to the read enable signal ENj[M-1:0] from the timing controller 410.

The digital processing circuitry 460 may receive the pixel values from the data buffer clusters 4501 to 450n, and perform digital processing (e.g., alignment processing) on the pixel values.

Referring to FIG. 4 and FIG. 5, the timing controller 410 may transfer a plurality of read enable signals EN1[M-1:0] to ENn[M-1:0] to the data buffer clusters 4501 to 450n, respectively. In each data buffer cluster 450j, the read enable signal ENj[M-1:0] may be sequentially transferred to a plurality of memories 451j of the corresponding data buffer cluster 450j. The timing controller 410 may sequentially enable M bits of the read enable signal ENj[M-1:0] to sequentially read M bits of pixel values from each memory 451j. The timing controller 410 may output an enable pulse having an enable level during a predetermined period as a read enable signal ENj[i] corresponding to each bit (the $i^{th}$ bit).

Each memory 451j of each data buffer cluster 450j may read and output the $i^{th}$ bit of the pixel value in response to the corresponding enable pulse ENj[i]. Although the enable pulse ENj[i] may be delayed by the memories 451j of the corresponding data buffer cluster 450j, a maximum delay time 511 may occur due to parasitic components of (N/n) memories 451j since the (N/n) memories 451j are formed in the data buffer cluster 450j. Therefore, the maximum delay time 511 may be shorter than the maximum delay time 311 in embodiments described with reference to FIG. 2 and FIG. 3.

As described above, since the maximum delay time 511 can be reduced, a signal transmission period 512 to be used for routing the pixel values of the data buffer cluster 450j to the digital processing circuitry 460 and a digital processing period 513 of the digital processing circuitry 460 can be sufficiently secured in the read cycle 510. Accordingly, a processing speed in the digital processing circuitry 460 can be reduced. As a result, a size of the digital processing circuitry 460 can be reduced or a peak current generated in the digital processing can be reduced.

Figure 6:
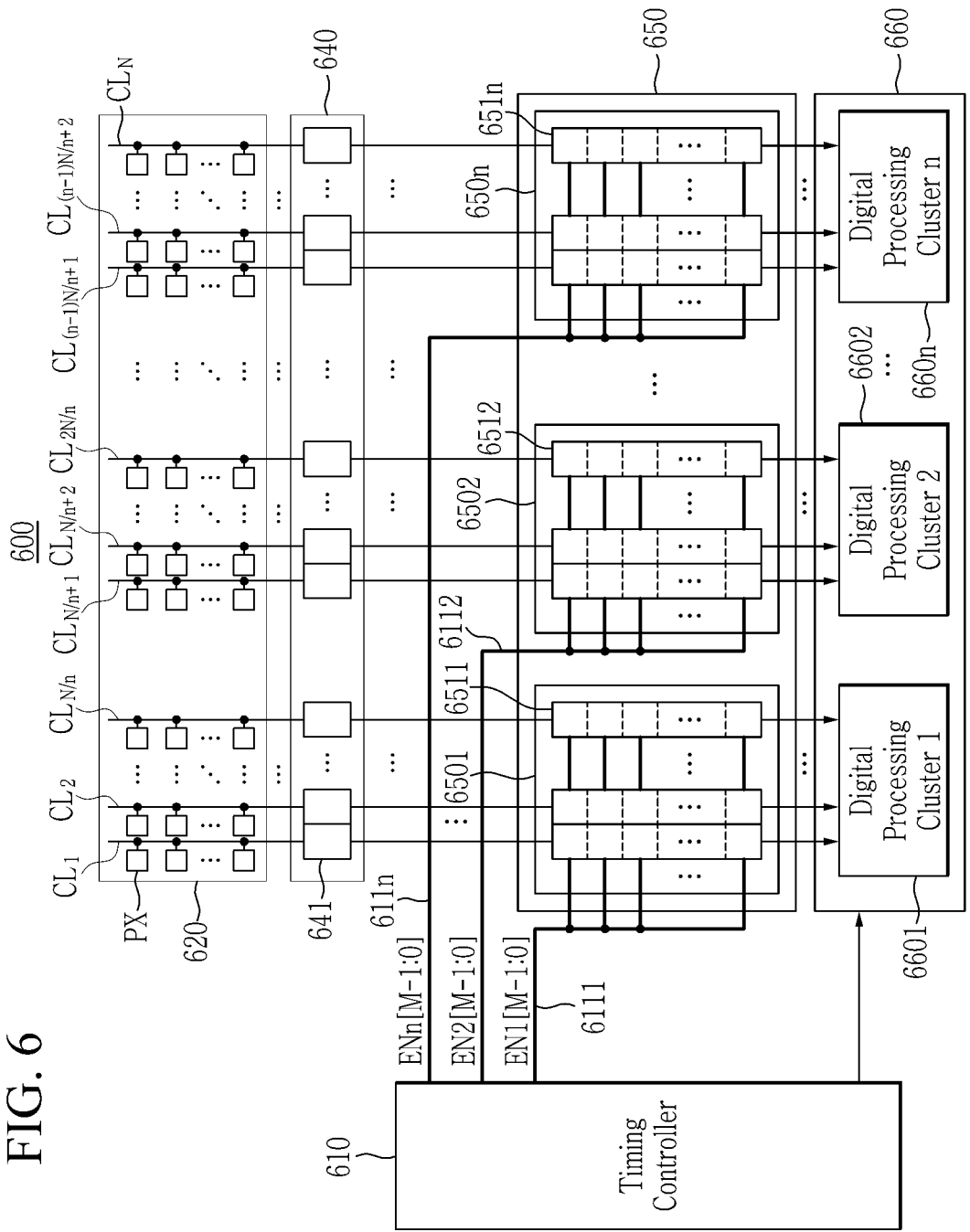
FIG. 6 is an example block diagram of an image sensor according to another embodiment.
Figure 7:
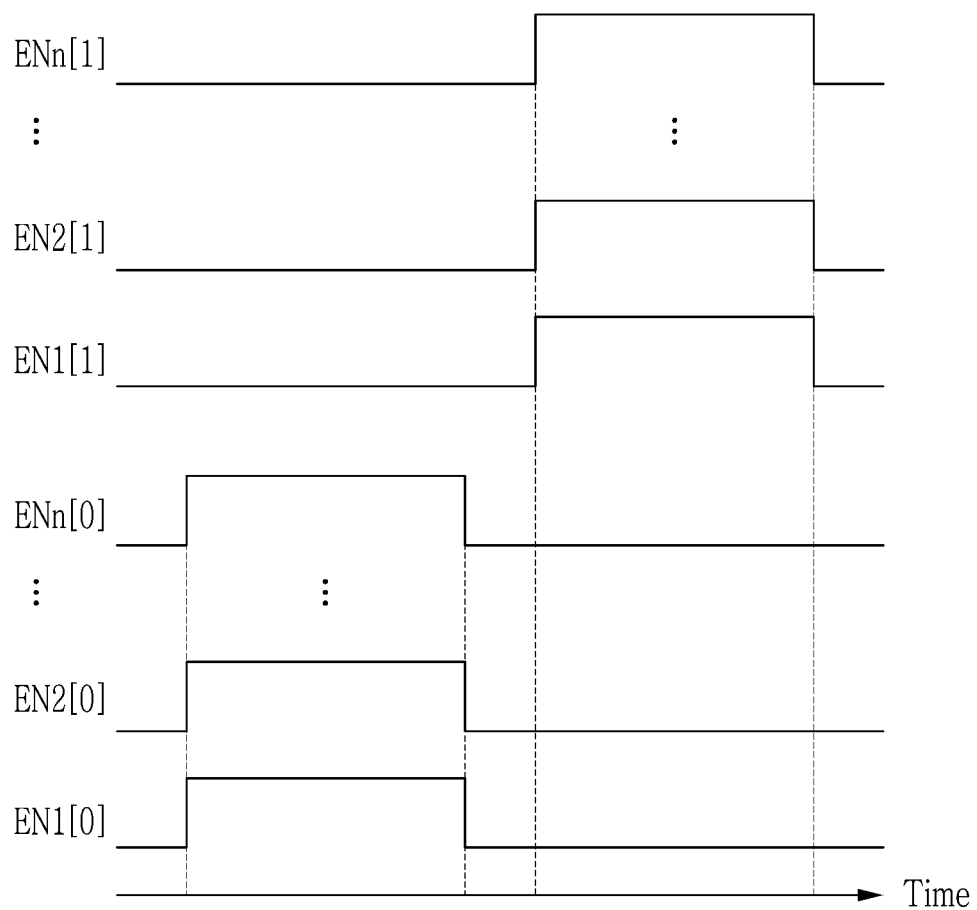
FIG. 7 and FIG. 8 are drawings each showing an operation timing of an image sensor according to another embodiment.
Figure 8:
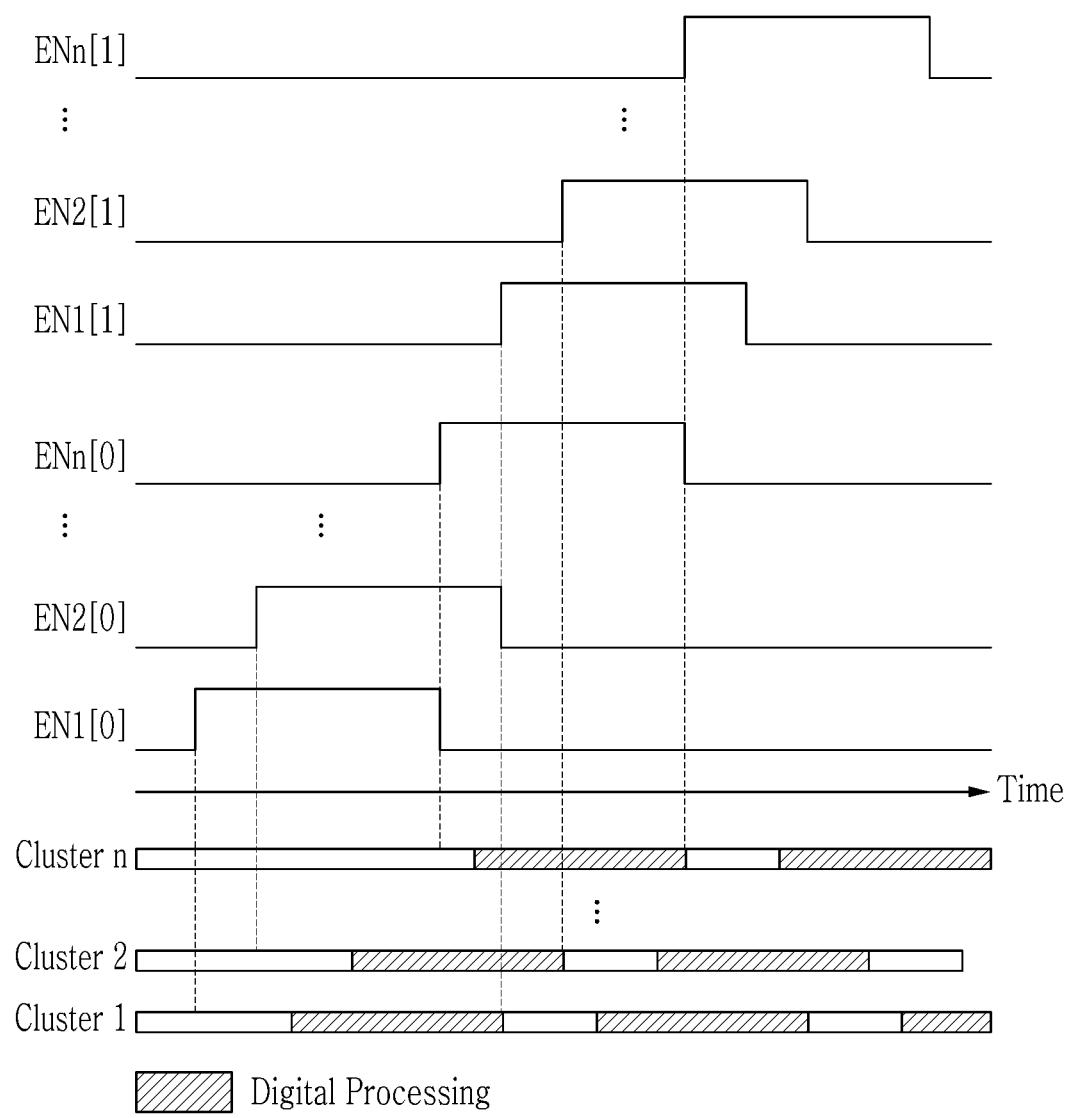

FIG. 6 is an example block diagram of an image sensor according to an embodiment, and each of FIG. 7 and FIG. 8 is a drawing showing an operation timing of an image sensor according to an embodiment. For convenience of description, FIG. 7 and FIG. 8 show read enable signals EN1[1:0], EN2[1:0] . . . ENn[1:0] corresponding to 2 bits of a pixel value.

Referring to FIG. 6, an image sensor 600 may include a timing controller 610, a pixel array 620, an ADC circuitry 640, a data buffer 650, and a digital processing circuitry 660. The data buffer 650 may be clustered into a plurality of data buffer clusters 6501, 6502 . . . 650n, and the digital processing circuitry 660 may be clustered into a plurality of digital processing clusters 6601, 6602 . . . 660n. Each of the data buffer clusters 6501 to 650n may include a plurality of memories 6511, 6512 . . . 651n. In some embodiments, the timing controller 610 may be connected to the data buffer clusters 6501 to 650n via buses 6111, 6112 . . . 611n, respectively.

As described with reference to FIG. 4, the pixel array 620 may include a plurality of pixels PX arranged in a matrix form and a plurality of column lines $CL_1$ to $CL_N$ respectively connected to the plurality of pixels PX. The column lines $CL_1$ to $CL_N$ may transfer pixel signals output from the pixels PX to the ADC circuitry 640. The ADC circuitry 640 may include a plurality of ADCs 641 that correspond to the column lines $CL_1$ to $CL_N$, respectively. Each data buffer cluster 650j may correspond some column lines consecutively arranged in a row direction (e.g., $CL_{(j-1)*N/n+1}$ to $CL_{j*N/n}$) among the column lines $CL_1$ to $CL_N$ of the pixel array 610.

The digital processing clusters 6601 to 660n may correspond to the data buffer clusters 6501 to 650n, respectively. Each digital processing cluster 660j may receive a plurality of pixel values from a corresponding data buffer cluster 650j and may perform digital processing (e.g., alignment processing) on the pixel values. As described above, the digital processing circuitry 660 may be clustered into the digital processing clusters 6601 to 660n, so that the buses connected between the data buffer 650 and the digital processing circuitry 660 to transfer pixel values can be distributed. Accordingly, it is possible to reduce congestion due to arrangement of the buses.

In some embodiments, as shown in FIG. 7, the timing controller 610 may transfer a plurality of read enable signals EN1[M-1:0] to ENn[M-1:0] at substantially the same timing to the data buffer clusters 6501 to 650n, respectively. The timing controller 610 may output the enable pulses EN1[M-1:0] to ENn[M-1:0] to have a start edge (e.g., a rising edge) at substantially the same timing.

In some embodiments, as shown in FIG. 8, the timing controller 610 may transmit a plurality of read enable signals EN1[M-1:0] to ENn[M-1:0] at different timings to the data buffer clusters 6501 to 650n, respectively. For example, the timing controller 610 may output the read enable signal EN(j+1)[i] by delaying it from the read enable signal ENj[i] by a predetermined time (or a delay time). Accordingly, a start edge (e.g., a rising edge) of an enable pulse EN(j+1)[i] transferred to the data buffer cluster 650(j+1) may be delayed by the predetermined from a start edge (e.g., a rising edge) of an enable pulse ENj[i] transferred to the data buffer cluster 650j. Since the memories 651j of each data buffer cluster 650j may read pixel values in response to the enable pulse ENj[i] and output the pixel values to the corresponding digital processing cluster 660j, digital processing periods in the digital processing clusters 6601 to 660n can be distributed as shown in FIG. 8. Further, since the digital processing periods in the digital processing clusters 6601 to 660n are distributed, a peak current can be distributed.

Figure 9:
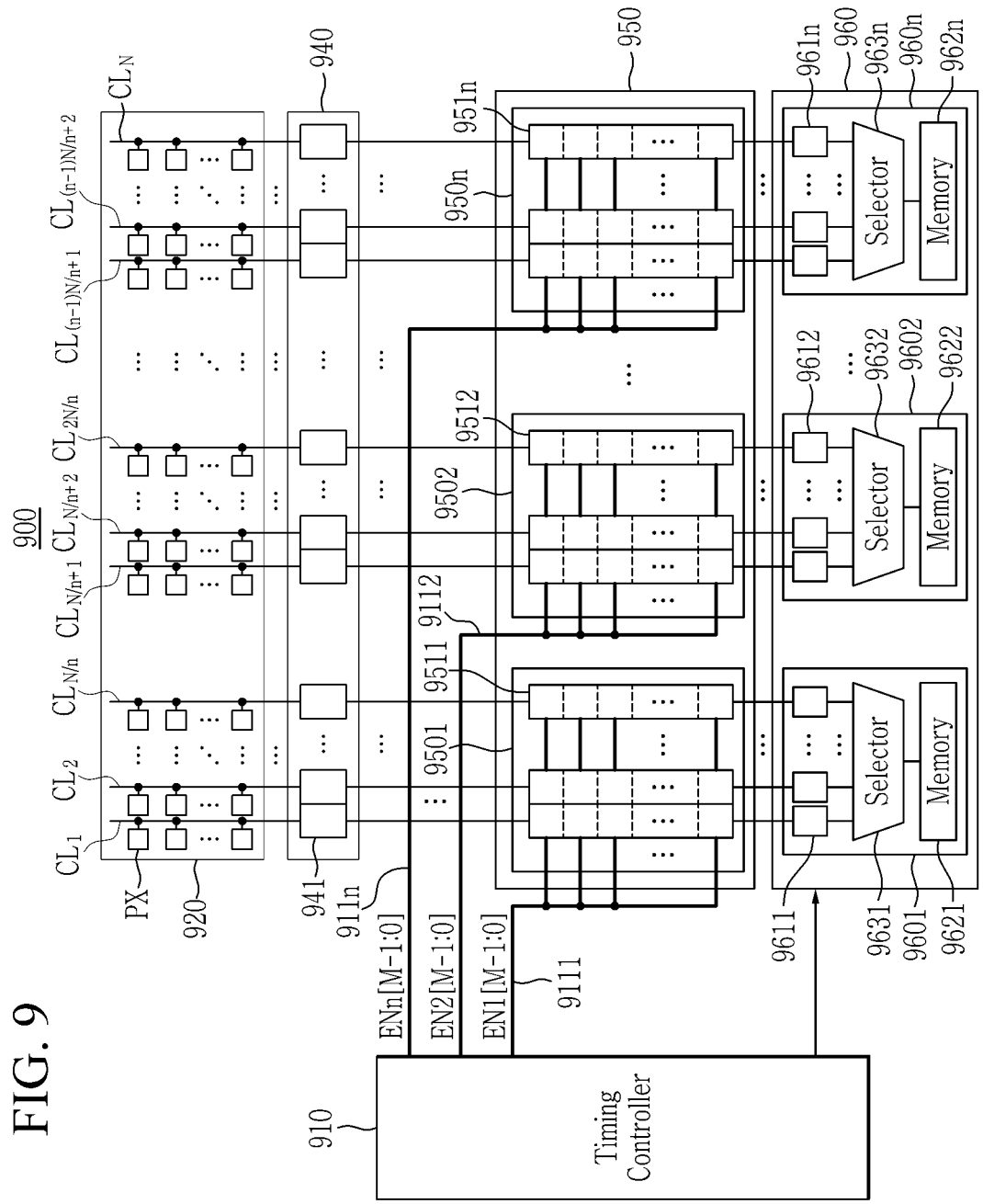
FIG. 9 is an example block diagram of an image sensor according to yet another embodiment.

FIG. 9 is an example block diagram of an image sensor according to an embodiment.

Referring to FIG. 9, an image sensor 900 may include a timing controller 910, a pixel array 920, an ADC circuitry 940, a data buffer 950, and a digital processing circuitry 960. As shown in FIG. 9, the data buffer 950 may clustered into a plurality of data buffer clusters 9501, 9502 . . . 950n and the digital processing circuitry 960 may clustered into a plurality of digital processing clusters 9601, 9602 . . . 960n. Each of the data buffer clusters 9501 to 950n may include a plurality of memories 9511, 9512 . . . 912n. In some embodiments, the timing controller 910 may be connected to the data buffer clusters 9501 to 950n via buses 9111, 9112 . . . 911n, respectively.

As described with reference to FIG. 4, the pixel array 920 may include a plurality of pixels PX arranged in a matrix form and a plurality of column lines $CL_1$ to $CL_N$ respectively connected to the plurality of pixels PX. The column lines $CL_1$ to $CL_N$ may transfer pixel signals output from the pixels PX to the ADC circuitry 940. The ADC circuitry 940 may include a plurality of ADCs 941 that correspond to the column lines $CL_1$ to $CL_N$, respectively. Each data buffer cluster 950j may correspond some column lines consecutively arranged in a row direction (e.g., $CL_{(j-1)*N/n+1}$ to $CL_{j*N/n}$) among the column lines $CL_1$ to $CL_N$ of the pixel array 910.

The digital processing clusters 9601 to 960n may include a plurality of first memories 9611, 9612 . . . 9612n and second memories 9621, 9622 . . . 962n. Each digital processing cluster 960j may include the plurality of first memories 961j and the second memory 962j. The first memory 961j of each digital processing cluster 960j may correspond to a plurality of memories 951j of a corresponding data buffer cluster 950j, respectively. The first memories 961j and the second memory 962j may be implemented with, for example, a flip-flop, a latch, an SRAM, or a combination thereof, but are not limited thereto.

Each first memory 961j may store a plurality of bits of a pixel value transferred from a corresponding memory 951j of the data buffer cluster 950j and may align the bits of the pixel value. In some embodiments, each first memory 961j may align the bits of the pixel value in response to a control signal from the timing controller 910. The second memory 962j may store the pixel values transferred from the first memories 961j and may align the pixel values based on addresses of pixels corresponding to the pixel values. In some embodiments, the second memory 962j may align the pixel values based on the addresses in response to a control signal from the timing controller 910.

In some embodiments, the digital processing clusters 9601 to 960n may further include selectors 9631, 9632 . . . , 963n, respectively. The selector 963j may be implemented with, for example, a multiplexer, but is not limited thereto. When the second memory 962j cannot simultaneously process the pixel values of the first memories 961j in the digital processing cluster 960j, the selector 963j may select some pixel values among the pixel values of the first memories 961j and communicate the selected pixel values to the second memory 962j. In some embodiments, the selector 963j may select some pixel values in response to a control signal from the timing controller 910.

Accordingly, each digital processing cluster 960j may transfer the pixel values that are aligned based on bits and also aligned based on the addresses to the image signal processor (e.g., 170 in FIG. 1).

Figure 10:
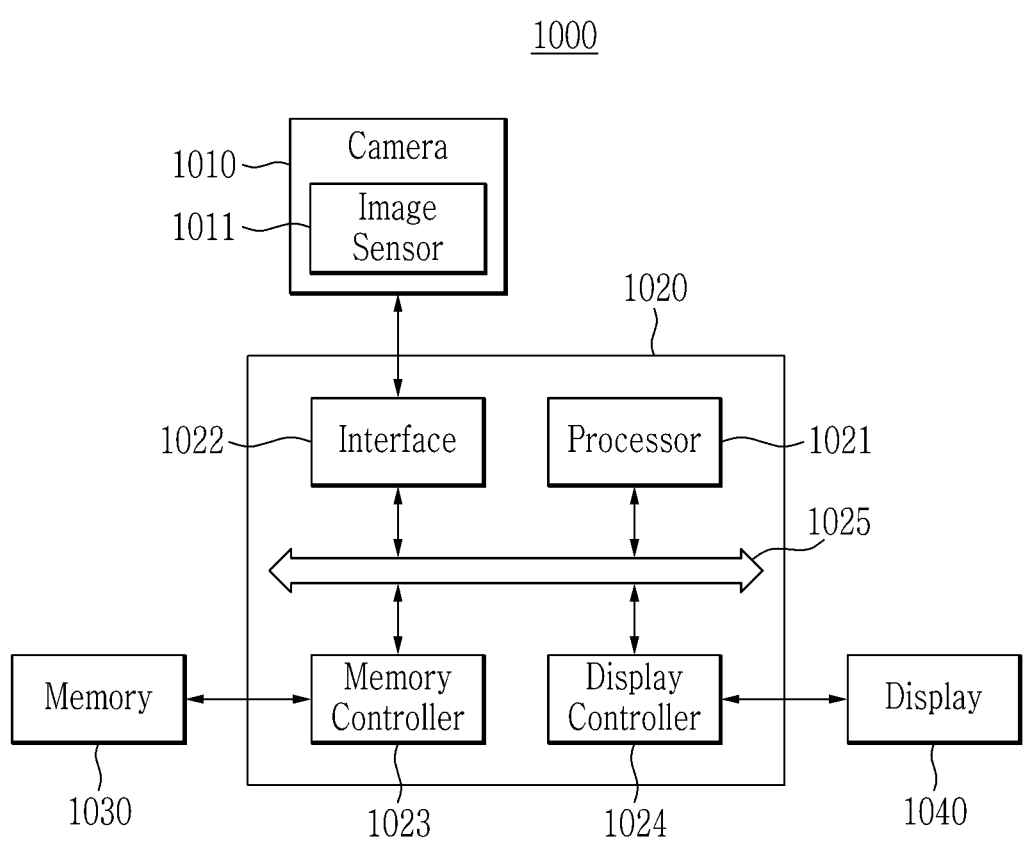
FIG. 10 is an example block diagram of a computer device according to an embodiment.

FIG. 10 is an example block diagram of a computer device according to an embodiment.

Referring to FIG. 10, the computing device 1000 may include a camera 1010, a controller 1020, a memory 1030, and a display 1040.

The camera 1010 may include an image sensor 1011. The image sensor 1011 may be implemented as the image sensor described with reference to FIG. 1 to FIG. 9. The camera 1010 may generate image data using the image sensor 1011, perform image signal processing on the image data, and output the processed image data to the controller 1020.

The controller 1020 may include a processor 1021. The processor 1021 may control an overall operation of each component of the computing device 1000. The processor 1021 may be implemented with at least one of various processing units such as a central processing unit (CPU), an application processor (AP), and a graphic processing unit (GPU). In some embodiments, the controller 1020 may be implemented as an integrated circuit or system on chip (SoC).

In some embodiments, as shown in FIG. 10, the controller 1020 may further include an interface 1022, a memory controller 1023, a display controller 1024, and a bus 1025. In some embodiments, at least part of the interface 1022, the memory controller 1023, the display controller 1024, and the bus 1025 may be provided external to the controller 1020. In some embodiments, the controller 1020 may further include an image signal processor.

The interface 1022 may transfer the image data received from the image sensor 1011 to the memory controller 1023 or the display controller 1024 through the bus 1025.

The memory 1030 may store various data and instructions. The memory controller 1023 may control transfers of the data or instructions to and from the memory 1030.

The display controller 1024 may transfer data to be displayed on the display 1040 to the display 1040 under a control of the processor 1021, and the display 1040 may display a screen according to the received data. In some embodiments, the display 1040 may further include a touch screen. The touch screen may transfer a user input for controlling an operation of the computing device 1000 to the controller 1020. The user input may be generated when a user touches the touch screen.

The bus 1025 may provide a communication function between the components of the controller 1020. The bus 1025 may include at least one type of bus according to a communication protocol between the components.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. An image sensor comprising:
    an analog-to-digital conversion circuitry configured to receive a plurality of pixel signals from a plurality of column lines, respectively, and convert the plurality of pixel signals into a plurality of first pixel values, respectively;
    a timing controller configured to output a plurality of enable signals;
    a plurality of data buffer clusters configured to correspond to the plurality of enable signals, respectively, and output a plurality of second pixel values, wherein each of the data buffer clusters is configured to store first pixel values, which correspond to some column lines consecutively arranged among the plurality of column lines, among the plurality of first pixel values, and output stored first pixel values as some second pixel values among the plurality of second pixel values in response to a corresponding enable signal among the plurality of enable signals; and
    a digital processing circuitry configured to perform digital processing on the plurality of second pixel values that are output from the plurality of data buffer clusters.

2. The image sensor of claim 1, wherein the digital processing comprises processing for aligning the plurality of second pixel values.

3. The image sensor of claim 1, wherein:
    the digital processing circuitry comprises a plurality of digital processing clusters configured to correspond to the plurality of data buffer clusters, respectively, and
    each of the digital processing clusters is configured to perform the digital processing on the some second pixel values output from a corresponding data buffer cluster among the plurality of data buffer clusters.

4. The image sensor of claim 3, wherein:
    the timing controller is configured to output the plurality of enable signals to have an enable pulse at substantially a same timing, and
    each of the data buffer clusters is configured to output the stored first pixel values in response to the enable pulse of the corresponding enable signal.

5. The image sensor of claim 3, wherein:
    the timing controller is configured to output the plurality of enable signals to have an enable pulse at different timings, and
    each of the data buffer clusters is configured to output the stored first pixel values in response to the enable pulse of the corresponding enable signal.

6. The image sensor of claim 5, wherein:
    the plurality of enable signals comprises a first enable signal and a second enable signal, and
        the timing controller is configured to delay a start edge of the enable pulse of the first enable signal from a start edge of the enable pulse of the second enable signal by a predetermined time.

7. The image sensor of claim 3, wherein each of the digital processing clusters comprises:
    a plurality of first memories configured to correspond to the some second pixel values, respectively, wherein each of the first memories is configured to store a corresponding second pixel value among the some second pixel values, and align bits of the corresponding second pixel value; and a second memory configured to align the some second pixel values in which the bits are aligned in the plurality of first memories, based on addresses.

8. The image sensor of claim 7, wherein each of the digital processing clusters further comprises a selector configured to select the some second pixel values in which the bits are aligned in the plurality of first memories, and transfer selected second pixel values to the second memory.

9. The image sensor of claim 1, further comprising a plurality of buses configured to transfer the plurality of enable signals to the plurality of data buffer clusters, respectively.

10. The image sensor of claim 1, wherein:
each of the data buffer clusters comprises a plurality of memories configured to store some first pixel values, respectively, and
each of the memories is configured to output a stored first pixel value in response to the corresponding enable signal.

11. The image sensor of claim 10, wherein:
each of the first pixel values have a plurality of bits,
each of the enable signals comprises a plurality of pulses that correspond to the plurality of bits, respectively, and
the timing controller is configured to sequentially output the plurality of pulses.

12. An image sensor comprising:
an analog-to-digital conversion circuitry configured to receive a plurality of pixel signals from a plurality of column lines, respectively, and convert the plurality of pixel signals into a plurality of first pixel values, respectively;
a timing controller configured to output an enable signal;
a plurality of data buffer clusters configured to output a plurality of second pixel values, wherein each of the plurality of data buffer clusters is configured to store first pixel values, which correspond to some column lines consecutively arranged among the plurality of column lines, among the plurality of first pixel values, and output stored first pixel values as some second pixel values among the plurality of second pixel values in response to the enable signal;
a plurality of buses configured to be connected to the plurality of data buffer clusters, respectively, wherein each of the buses is configured to transfer the enable signal from the timing controller to a connected data buffer cluster among the plurality of data buffer clusters; and
a digital processing circuitry configured to perform digital processing on the plurality of second pixel values that are output from the plurality of data buffer clusters.

13. The image sensor of claim 12, wherein:
the digital processing circuitry comprises a plurality of digital processing clusters configured to correspond to the plurality of data buffer clusters, respectively, and
each of the digital processing clusters is configured to perform the digital processing on the some second pixel values output from a corresponding data buffer cluster among the plurality of data buffer clusters.

14. The image sensor of claim 13, wherein:
the enable signal comprises a plurality of enable signals that correspond to the plurality of data buffer clusters, respectively, and have an enable pulse at different timings, and
each of the plurality of data buffer clusters is configured to output the stored first pixel values in response to the enable pulse of a corresponding enable signal among the plurality of enable signals.

15. The image sensor of claim 12, wherein the digital processing comprises processing for aligning the plurality of second pixel values.

16. An image sensor comprising:
a pixel array comprising a plurality of first pixels consecutively arranged in a row direction and a plurality of second pixels consecutively arranged in the row direction;
an analog-to-digital conversion circuitry configured to convert first pixel signals of the plurality of first pixels into a plurality of first pixel values, respectively, and convert second pixel signals of the plurality of second pixels into a plurality of second pixel values, respectively;
a timing controller configured to output a first enable signal and a second enable signal;
a first data buffer cluster configured to store the plurality of first pixel values, and output the plurality of first pixel values in response to the first enable signal;
a second data buffer cluster configured to store the plurality of second pixel values, and output the plurality of second pixel values in response to the second enable signal; and
a digital processing circuitry configured to perform digital processing on the plurality of first pixel values output from the first data buffer cluster and the plurality of second pixel values that are output from the second data buffer cluster.

17. The image sensor of claim 16, wherein:
the first enable signal and the second enable signal have an enable pulse at substantially a same timing,
the first data buffer cluster is configured to output the plurality of first pixel values in response to the enable pulse of the first enable signal, and
the second data buffer cluster is configured to output the plurality of second pixel values in response to the enable pulse of the second enable signal.

18. The image sensor of claim 16, wherein the digital processing circuitry comprises:
a first digital processing cluster configured to perform the digital processing on the plurality of first pixel values output from the first data buffer cluster; and
a second digital processing cluster configured to perform the digital processing on the plurality of second pixel values that are output from the second data buffer cluster.

19. The image sensor of claim 18, wherein:
the first enable signal and the second enable signal have an enable pulse at different timings,
the first data buffer cluster is configured to output the plurality of first pixel values in response to the enable pulse of the first enable signal, and
the second data buffer cluster is configured to output the plurality of second pixel values in response to the enable pulse of the second enable signal.

20. The image sensor of claim 16, wherein the digital processing comprises processing for aligning the plurality of first pixel values and the plurality of second pixel values.

* * * * *